United States Patent [19]

Lorenzo

[11] Patent Number: 4,893,537
[45] Date of Patent: Jan. 16, 1990

[54] APPARATUS FOR CUTTING SINGLE AND DOUBLE GLASS SHEETS

[76] Inventor: Giorgio Lorenzo, via Pasteur, 7--20017 Passirana di Rho, Milano, Italy

[21] Appl. No.: 219,347

[22] Filed: Jul. 14, 1988

[30] Foreign Application Priority Data

Jul. 17, 1987 [IT] Italy ............................. 21335A/87

[51] Int. Cl.$^4$ .......................... B26D 3/08; B26D 1/18
[52] U.S. Cl. .................................... 83/885; 83/471.2; 83/487; 83/560; 83/571
[58] Field of Search ................. 83/885, 886, 883, 884, 83/879, 560, 485, 487, 51, 471.2, 571

[56] References Cited

U.S. PATENT DOCUMENTS

| 2,078,386 | 4/1937 | Kendis | 83/885 |
| 3,151,794 | 10/1964 | Brand | 83/884 |
| 3,424,357 | 1/1969 | Curtzc et al. | 83/879 |
| 4,009,628 | 3/1977 | Kato | 83/884 |
| 4,221,150 | 9/1980 | Bergfelt et al. | 83/884 |
| 4,495,845 | 1/1985 | Sherby | 83/886 |
| 4,544,367 | 10/1985 | Vossen | 83/886 |
| 4,577,539 | 3/1986 | Bonacci | 83/886 |
| 4,736,661 | 4/1988 | Shirai | 83/883 |

*Primary Examiner*—Frank T. Yost
*Assistant Examiner*—Scott A. Smith
*Attorney, Agent, or Firm*—Bucknam & Archer

[57] ABSTRACT

An automatic apparatus specifically designed for cutting single and double glass sheets, comprising a bearing frame defining a movable-strip supporting surface for supporting the glass sheet to be cut, on the frame being further provided a movable framework consisting of a lower cross-member and an upper cross-member which may be coupled to one another, the cross-members slidingly supporting a lower cutting head and an upper cutting head, the cutting heads being adapted for moving in a substantially perpendicular direction to the displacement direction of the framework.

1 Claim, 1 Drawing Sheet

APPARATUS FOR CUTTING SINGLE AND DOUBLE GLASS SHEETS

BACKGROUND OF THE INVENTION

The present invention relates to an automatic apparatus, which has been specifically designed for cutting glass sheets, either of the single or of the double type.

As is known, there are presently commercially available apparatus for cutting glass sheets, which generally cut single glass sheets along two substantially perpendicular directions.

These known apparatus generally comprise a supporting frame thereon a cross-member may be displaced which supports a glass sheet cutting head driven in a substantially perpendicular direction to the displacement direction of the cross-member.

The known apparatus, actually, have been found to be generally satisfactory for cutting single glass sheets.

However, as double glass sheets mus be cut, the known apparatus are not able of providing automatic cutting operations and have great drawbacks the main of which is a rather high time loss. Moreover the mentioned glass sheet cutting apparatus are very complex construction-wise and require very expensive maintenance operations.

SUMMARY OF THE INVENTION

Thus, the main object of the present invention is to overcome the above mentioned drawbacks, by providing an automatic apparatus, specifically designed for cutting single and double glass sheets, which affords the possibility of contemporaneously cutting, in a single passage, two superimposed spaced glass sheets, so as to greatly reduce the cutting time and cuth the two glass sheets with a high accuracy.

Another object of the present invention is to provide a glass sheet cutting apparatus which may also be used for cutting single glass sheets, in a very simple and quick way, that is without the need of carrying out complex and long operations for adjusting and setting the apparatus itself.

Another object of the present invention is to provide a glass sheet cutting apparatus which is very reliable and safe in operation.

Yet another object of the present invention is to provide an automatic apparatus, specifically designed for cutting single and double glass sheets which may be constructed using easily commercially available materials and elements and which, moreover, is very competitive from a mere economic standpoint.

According to one aspect of the present invention the above mentioned objects, as well as yet other objects, which will become more apparent hereinafter, are achieved by an automatic apparatus, specifically designed for cutting single and double glass sheets, characterized in that it comprises a bearing frame defining a movable-strip supporting surface for supporting a glass sheet, said bearing frame movably bearing a framework consisting of an upper cross-member and a lower cross-member, said cross-members being adapted for mutual connection, there being moreover provided an upper cutting head and a lower cutting head which are adapted to be displaced on said cross-members along a substantially perpendicular direction to the displacement direction of said framework.

Further characteristics and advantages of the present invention will become more apparent hereinafter from the following detailed description of a preferred though not exclusive of an automatic apparatus, specifically designed for cutting single or double glass sheets, which is illustrated, by way of an indicative but not limitative example in the figures of the accompanying drawings, where:

FIG. 1 is a partially cross-sectional view illustrating the apparatus according to the present invention and illustrating moreover, in a detailed way, the lower cross-member and upper cross-member included in said apparatus; and FIG. 2 is another cross-sectional view of the apparatus according to the present invention, taken along a substantially perpendicular direction to the section plane of FIG. 1.

DESCRIPTION OF THE PREFERRED EMBODIMENT

Figure 1:
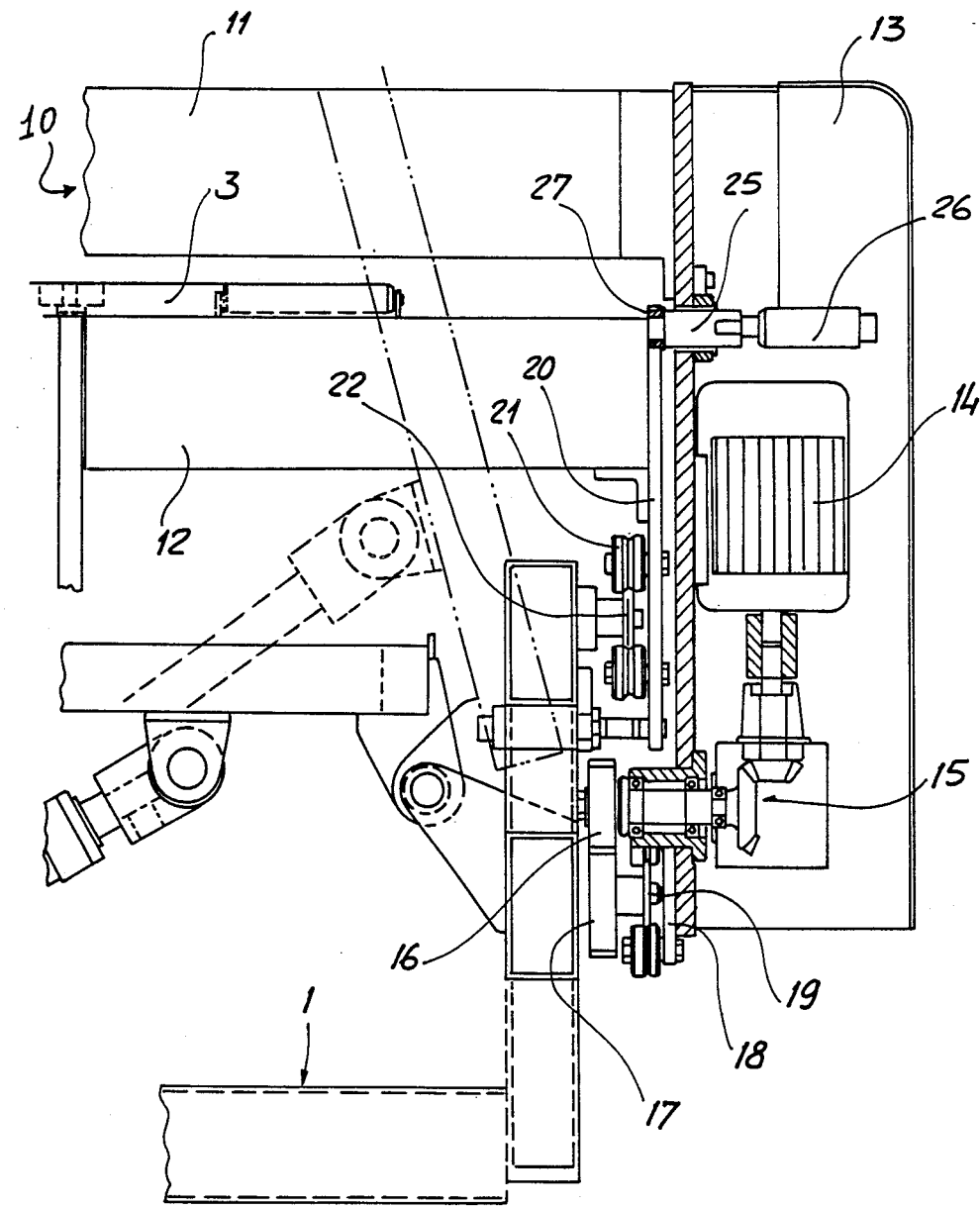

With reference to the above mentioned figures, the automatic apparatus, specifically designed for cutting single and double glass sheets according to the present invention, comprises a bearing frame, which has been overally indicated at the reference number 1, which supports a cutting or working table or surface, which has been overally indicated at the reference number 2.

The cutting or working table, in particular consists of a plurality of longitudinal adjoining strips 3 which are supported by piston members 4 which, in turn, are adapted for lowering the single strips 3 in order to prevent said strips from interfering with the glass sheet cutting operations, as disclosed in a more detailed way hereinafter.

The mentioned bearing frame movably supports a framework, overally indicated by the reference number 10 which consists of an upper cross-member 11 and a lower cross-member 12, which respectively lie above and under said cutting or working table.

The upper cross-member 11 extends from side walls 13 which support a driving motor 14 which, through bevel gears, indicated overally at the reference number 15, drives a driving pinion 16 meshing with a longitudinal rack 17 for displacing said framework in a substantially perpendicular direction to the strips 3.

Said sidewalls 13 are provided with guiding carriages 18 engaging with longitudinal guiding strips 19 so as to act as a supporting member.

To the lower cross-member 12 side shoulders 20 are coupled, said side shoulders being provided with a guiding lower carriage 21 engaging with auxiliary guiding rods 22 for displacing said lower cross-member.

A main feature of the present invention is that there are provided removable coupling means for coupling said lower and upper cross-members, said coupling means consisting of a pawl 25 which may be driven by a small piston 26, for engaging in a seat 27, formed in said sidewalls 20, so as to rigidly connect, during the displacement, the lower and upper cross-members, as required.

As the pawl 25 is disengaged from the seat 27, the motor 14 drives the single upper cross-member, whereas the lower cross-member is held stationary.

The upper cross-member 11 supports an upper glass sheet cutting upper head, indicated overally at the reference number 30, whereas the lower cross-member 12 supports a lower glass sheet cutting head, indicated overally at the reference number 31.

Each glass sheet cutting head 30 and 31, which respectively lie above and under said cutting or working table, thereon there is supported the glass sheet 35 to be cut, is provided with a driving motor 40, for transversal displacement, which, through a suitable linkage, drives a vertical translation pignon 41, meshing with a rack 42.

There are moreover provided cross guiding small carriages 43 which practically support said glass cutting heads with respect to the mentioned cross-members.

As the mentioned motors 40 are driven, the glass sheet cutting heads are displaced along the cross-members 11 and 12, along a direction which is substantially perpendicular to the displacement direction of said cross-members.

More specifically, the glass sheet cutting heads 30,31 are provided with a cutting small wheel 50, which is supported by a cutting carriage 51 which is coupled to a stem 52 susceptible to be moved toward and away from the glass sheet, by means of a driving piston member, indicated at 53, and preferably of the hydraulic type.

During the operation of the disclosed cutting apparatus, as a double glass sheet is to be cut, the two cross-members 11 and 12 are coupled to one another, by engaging the pawl 25 in the seat 27 and operating the motor 14.

The displacement of the lower cross-member 12 is performed owing to the fact that the strips 3 forming the cutting or working table 2, can be individually displaced, in such a way that, at the passage of the cross-member, the involved strips are lowered, thereby allowing for the cross-member to freely pass. Then said lowered strips are raised again to reform the cutting or working table, after the lower cross-member is passed through.

The displacement of the cutting heads in a direction perpendicular to the longitudinal displacement caused by the displacement of said framework, is obtained by operating the motors 40, which may be operated in a timed relationship, so as to provide a simultaneous cutting operation along the direction defined by said cross-members.

The cutting apparatus according to the present invention also affords the possibility of cutting single glass sheets; to that end it will be sufficient to disengage the pawl 25 from the seat 27 and to operate the motor 14 to displace the single upper cross-member which will cut the single glass sheet according to a substantially conventional method.

From the above disclosure it should be apparent that the cutting apparatus according to the present invention fully achieves the intended objects.

In this connection, it should be pointed out that the provision of a working or cutting table formed by movable strips, provides the possibility of adopting a framework including a lower cross-member for supporting a lower cutting head which may be displaced, with respect to the working table, since the strips are gradually lowered to allow for said cross-member to pass, and then they are raised again to reform the working table.

Another main feature of the invention is that the cutting apparatus of the invention may be easily be used for cutting single glass sheets, since the lower cross member may be quickly and easily disengaged to be easily displaced.

The invention as disclosed is susceptible to several modifications and variations all of which come within the scope of the invention.

Moreover all of the details may be replaced by other technically equivalent elements.

In practicing the invention the used materials, provided that they are compatible to the intended use, as well as the contingent size and shapes, may be any according to requirements.

I claim:

1. An apparatus for cutting either single or double glass sheets, comprising a bearing frame defining a movable-strip supporting table for supporting a glass sheet to be cut, said bearing frame supporting a framework consisting of a upper cross-member and a lower cross-member, adapted for mutual connection, there being moreover provided a upper glass sheet cutting head and a lower glass sheet cutting head movably supported on said cross-members, said supporting table consisting of a plurality of adjoining strips supported by a corresponding plurality of piston members for displacing said strips in a direction substantially perpendicular to said supporting table, said upper cross-member being supported by sidewalls supporting a motor for longitudinal displacement, said motor being coupled, through bevel gears, to a driving pinion meshing with a main rack supported by said bearing frame, said sidewalls supporting guiding carriages engaging with guiding rods coupled to said bearing frame, said lower cross-member being supported by side shoulders provided with small sliding carriages adapted for sliding on auxiliary sliding rods, wherein said apparatus further comprises removable coupling means for coupling said shoulders and sidewalls, consisting of a pawl supported by said sidewalls and driven by a coupling piston member for removably engaging it within a seat formed on said shoulders.

* * * * *